(12) United States Patent
Sultana et al.

(10) Patent No.: US 12,486,776 B2
(45) Date of Patent: Dec. 2, 2025

(54) TURBINE ROTOR COMPRISING A BLADE STOP RING CONFIGURED TO AID THE COOLING OF THE BLADE ROOTS

(71) Applicant: Safran Aircraft Engines, Paris (FR)

(72) Inventors: Patrick Jean Laurent Sultana, Moissy-Cramayel (FR); Matthieu Simon, Moissy-Cramayel (FR); Loic Ansart, Moissy-Cramayel (FR); Joao Antonio Amorim, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/837,511

(22) PCT Filed: Feb. 7, 2023

(86) PCT No.: PCT/FR2023/050157
§ 371 (c)(1),
(2) Date: Aug. 9, 2024

(87) PCT Pub. No.: WO2023/152440
PCT Pub. Date: Aug. 17, 2023

(65) Prior Publication Data
US 2025/0035003 A1 Jan. 30, 2025

(30) Foreign Application Priority Data
Feb. 10, 2022 (FR) ........................ 2201188

(51) Int. Cl.
*F01D 5/30* (2006.01)
*F01D 5/32* (2006.01)
(Continued)

(52) U.S. Cl.
CPC ............. *F01D 5/32* (2013.01); *F01D 5/3007* (2013.01); *F01D 11/001* (2013.01); *F01D 25/12* (2013.01);
(Continued)

(58) Field of Classification Search
CPC . F01D 5/32; F01D 5/30; F01D 5/3007; F01D 11/001; F01D 25/12;
(Continued)

(56) References Cited

U.S. PATENT DOCUMENTS 4,171,930 A * 10/1979 Brisken ................. F01D 5/3007
416/193 A
2004/0062643 A1 4/2004 Brauer et al.
(Continued)

FOREIGN PATENT DOCUMENTS

EP 2 357 321 A2 8/2011
EP 3 052 762 A2 8/2016
(Continued)

OTHER PUBLICATIONS

International Search Report for PCT/FR2023/050157 mailed on May 30, 2023.

*Primary Examiner* — Nathaniel E Wiehe
*Assistant Examiner* — Theodore C Ribadeneyra
(74) *Attorney, Agent, or Firm* — BIRCH, STEWART, KOLASCH & BIRCH, LLP

(57) ABSTRACT

The present invention relates to a turbine rotor (1) comprising a rotor disc (2), provided at its periphery with a plurality of axial cells (23) for receiving a bilobed root (30) of a blade (3), each cell (23) comprising a radially inner cavity (232) and a radially outer cavity (231). This rotor is characterised in that it comprises a ring (4) for axially retaining the blade roots and an annular flange (5), the ring (4) comprising a radially inner portion provided with notches (43) and being (Continued)

arranged against the upstream face (21) of the disc (2), so that each of its notches (43) is located opposite a cell (23) of the disc (2), the flange (5) being secured against the upstream face of the ring (4), forming a space (E) with said disc (2), and comprising at least one air-intake opening (54) which opens into said space (E), and in that each blade (3) comprises a groove (33) for receiving the outer circumferential edge (46) of said ring (4).

10 Claims, 3 Drawing Sheets

(51) Int. Cl.
  *F01D 11/00* (2006.01)
  *F01D 25/12* (2006.01)
(52) U.S. Cl.
  CPC ...... *F05D 2220/32* (2013.01); *F05D 2240/30* (2013.01); *F05D 2240/55* (2013.01); *F05D 2240/90* (2013.01); *F05D 2260/20* (2013.01)

(58) Field of Classification Search
  CPC ............. F05D 2220/32; F05D 2240/30; F05D 2240/55; F05D 2260/20
  See application file for complete search history.

(56) References Cited

U.S. PATENT DOCUMENTS

| | | | |
|---|---|---|---|
| 2016/0186590 A1* | 6/2016 | Himes | F01D 11/006 29/889.21 |
| 2023/0160313 A1 | 5/2023 | Rosset | |

FOREIGN PATENT DOCUMENTS

| | | |
|---|---|---|
| FR | 3 108 941 A1 | 10/2021 |
| WO | WO 2015/073112 A2 | 5/2015 |

\* cited by examiner

TURBINE ROTOR COMPRISING A BLADE STOP RING CONFIGURED TO AID THE COOLING OF THE BLADE ROOTS

FIELD OF THE INVENTION

This invention lies in the field of turbine rotors for gas turbine engines.

More specifically, the invention relates to the cooling and axial retaining of the roots of turbine rotor blades, these blade roots being of so-called «fir-tree» or «bilobed» shape.

The invention also relates to a turbine of a gas turbine engine and to a gas turbine engine provided with said rotor.

PRIOR ART

Conventionally a gas turbine engine successively comprises from upstream to downstream a low pressure compressor and high pressure compressor, a combustion chamber, a high pressure turbine and low pressure turbine through which there passes an airstream (upstream and downstream being defined in relation to the direction of flow of this airstream within the gas turbine engine).

Each turbine comprises several axially successive stages from upstream to downstream. Each stage comprises an annular stationary nozzle guide vanes and a mobile rotor driven in rotation about an axis of rotation which merges with the longitudinal axis of the gas turbine engine.

Each rotor comprises a rotor disc and a plurality of radial blades extending around this disc. The rotor disc, on the periphery thereof, is provided with a plurality of slots opening onto the outer circumference thereof, each slot being configured to receive the root of said blade.

A so-called «high-speed» low pressure turbine has been developed. It is so called since the rotor thereof is driven in rotation at a greater speed than the rotor of a conventional low pressure turbine. To withstand this high rotation speed, the roots of the rotor blades have a so-called «fir-tree» or «bilobed» shape of which an example of embodiment can be seen in appended FIG. 1.

In this Figure a rotor disc A can be seen having a plurality of slots, of which only one referenced B is illustrated, to receive the root C of a blade D. The blade root C is bilobed i.e. it comprises a radially outer lobe C1, positioned close to the blade D, that is extended by a radially inner lobe C2. The receiving slot B accordingly comprises a radially outer cavity B1 opening outwardly from the rotor disc and configured to receive lobe C1, and a radially inner cavity B2 opening into the radially outer cavity B1 and configured to receive lobe C2.

To ensure efficient cooling of the blade root C, the cooling air must not only pass into the radially inner cavity B2 of the slot, but also into the radially outer cavity B1.

Yet in the current state of the art, the blade root C is axially retained inside the slot B by a stop ring and a flange (not visible in FIG. 1) which block the passing of cooling air into the radially outer cavity B1 of slot B. This leads to risks of heating and damage to the blade root.

From document EP 2 357 321 a turbine rotor is already known comprising a rotor disc provided on the periphery thereof with a plurality of axial slots, each configured to receive a blade root. This rotor disc also comprises a ring axially retaining the blade roots and an annular flange disposed in contact with the retaining ring. This retaining ring is provided with recesses each having a central channel and side channels.

However, the shape and arrangement of these recesses are such that only the ends of the side channels lie opposite a small part of the slots receiving the blade roots, and cooling is inefficient.

SUMMARY OF THE INVENTION

It is therefore the objective of the invention to solve the aforementioned problem and to propose a rotor structure which allows axial locking of the blade root inside the slot in both directions i.e. toward upstream and toward downstream, whilst allowing efficient cooling of the radially inner cavity and radially outer cavity of the slot.

For this purpose, the invention concerns a turbine rotor comprising:
  a rotor disc having a longitudinal axis of rotation and a plurality of radial blades, this rotor disc being provided on the periphery thereof with a plurality of axial slots each configured to receive a blade root, each blade having a blade root of bilobed shape and each slot comprising a radially inner cavity extended by a radially outer cavity;
  a ring axially retaining the blade roots, this retaining ring comprising a radially inner portion provided with recesses and a solid radially outer portion;
  an annular flange secured on the upstream side of the rotor disc so that the radially outer end thereof is in contact with the retaining ring, this annular flange being configured to form a space with said rotor disc and comprising at least one air-intake orifice opening into said space;
and each blade comprises a groove to receive the outer circumferential edge of said retaining ring.

According to the invention:
  each recess of the retaining ring is circumferentially delimited on either side by two radial extensions of the retaining ring;
  the width, in circumferential direction, of a recess is greater than or equal to the width, in circumferential direction, of a slot;
  and this retaining ring is arranged against the upstream face of the rotor disc, so that each of the recesses thereof lies facing a slot of the rotor disc,
  so that the cooling air is able to enter via said at least one air-intake orifice into said space and to pass through the recesses to reach the radially outer cavity of the slots of said rotor disc.

By means of these characteristics of the invention, the flange and retaining ring cooperate to hold the blade root axially within the receiving slot of the rotor disc, thereby preventing any displacement of this blade toward upstream or downstream, whilst allowing efficient cooling of the inner and outer cavities respectively of the slot through the presence of the recesses of the retaining ring.

According to other advantageous, nonlimiting characteristics of the invention taken alone or in combination:
  the retaining ring comprises as many recesses as there are slots on the rotor disc to receive a blade root;
  the rotor comprises an annular seal arranged between the radially outer end of the annular flange and the upstream face of the solid radially outer portion of said retaining ring;
  the annular flange has as many cooling orifices as there are slots on the rotor disc;
  the annular flange generally comprises an axial branch and a radial branch, the axial branch is secured to the rotor disc and the radially outer end of said radial branch is in contact with the upstream face of the radially outer portion of said retaining ring, and said at least one air-intake orifice is formed in the radial branch of the annular flange;

the retaining ring comprises several ring segments arranged end-to-end circumferentially about the longitudinal axis of rotation.

the height, in radial direction, of each of the two extensions disposed circumferentially on either side of a recess is lower than the height, in radial direction, of the slot receiving a blade root and onto which the recess opens.

The invention also concerns a turbine of a gas turbine engine, in particular a low pressure turbine equipped with the aforementioned rotor.

Finally, the invention concerns a gas turbine engine comprising at least said turbine.

DESCRIPTION OF THE FIGURES

Other characteristics, objectives and advantages of the invention will become apparent from the following description that is solely illustrative and nonlimiting and is to be read in connection with the appended drawings in which.

DETAILED DESCRIPTION OF THE INVENTION

Figure 1:
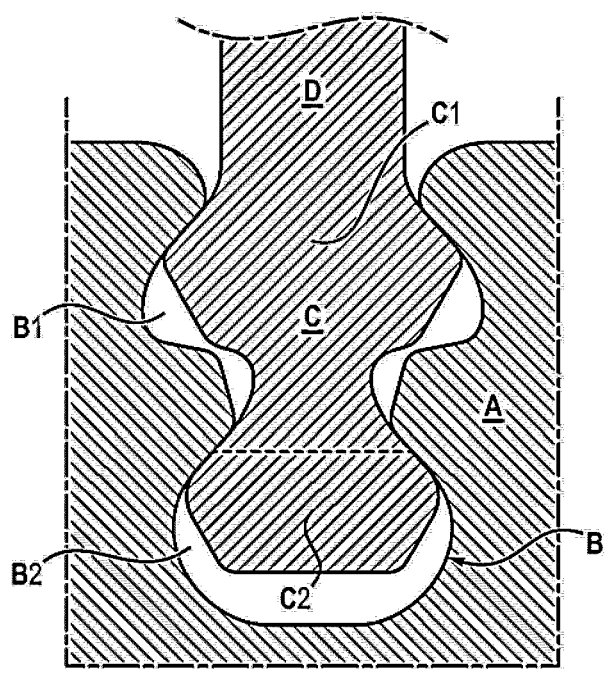
FIG. 1 illustrates a slot of a rotor disc and blade root of fir-tree shape received in this slot.
Figure 2:
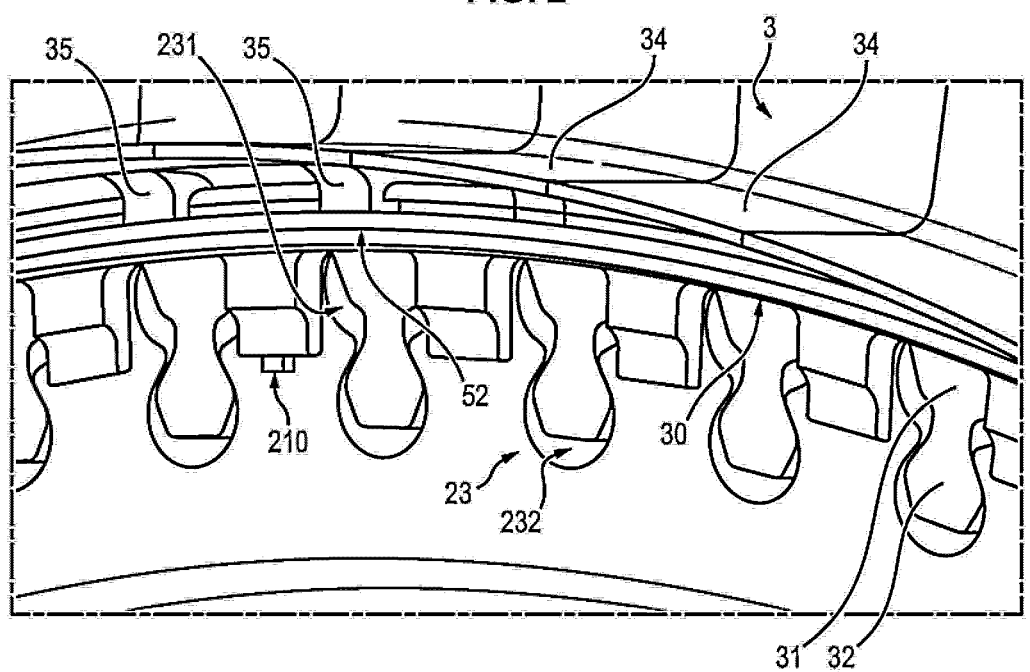
FIG. 2 is a partial perspective view of a rotor disc, blades, retaining ring and flange conforming to the invention.
Figure 3:
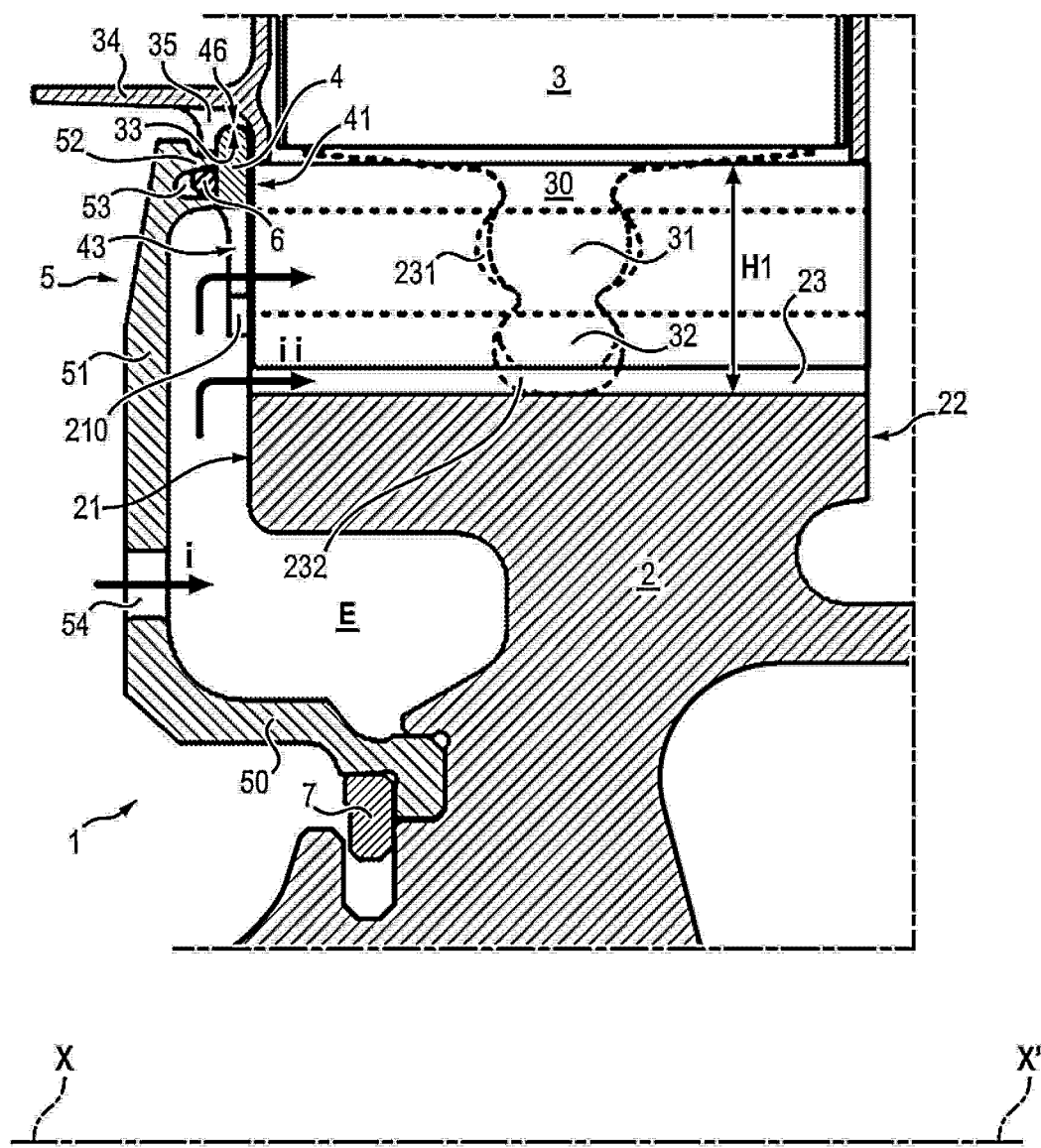
FIG. 3 is a partial axial cross-sectional view of the rotor disc, blade, retaining ring and flange conforming to the invention.

With reference to FIGS. 2 and 3, a rotor 1 can be seen comprising a rotor disc 2 and a plurality of radial blades 3 arranged around this rotor disc. The rotor disc 2 is driven in rotation about an axis of rotation X-X', which is also the central longitudinal axis thereof.

The rotor disc 2 has an upstream face 21 and opposite downstream face 22.

In the remainder of the description and claims, the expressions «radially inner» and «radially outer» are to be considered in relation to the position of the axis X-X'.

Each blade 3 comprises a blade root 30 of fir-tree or bilobed shape. Each blade root 30 therefore comprises a radially outer lobe 31 extended in the radial inner direction by a radially inner lobe 32.

The rotor disc 2, on the periphery thereof, additionally comprises a plurality of axial slots 23 each allowing the receiving of a root 30 of a blade 3. Each slot 23 opens radially outwardly.

As previously explained, each slot 23 comprises a radially outer cavity 231 which opens outwardly and is radially extended inwardly by a radially inner cavity 232. Cavity 231 receives lobe 31, and cavity 232 receives lobe 32 of the blade root.

In the invention, the rotor 1 also comprises a retaining ring 4 and an annular flange 5 now described in more detail.

The ring 4 allows axial retaining of the roots 30 of the blades 3. As can be better seen in FIG. 4, this ring 4 has a planar upstream face and opposite downstream face 41 that is also planar. In addition, this axial retaining ring 4 comprises a radially inner portion 42 provided with a plurality of recesses 43 and a solid radially outer portion 44. The radially outer portion 44 is said to be «solid» since it does not have any recesses 43. In other words, the recesses 43 do not extend as far as this portion.

Figure 4:
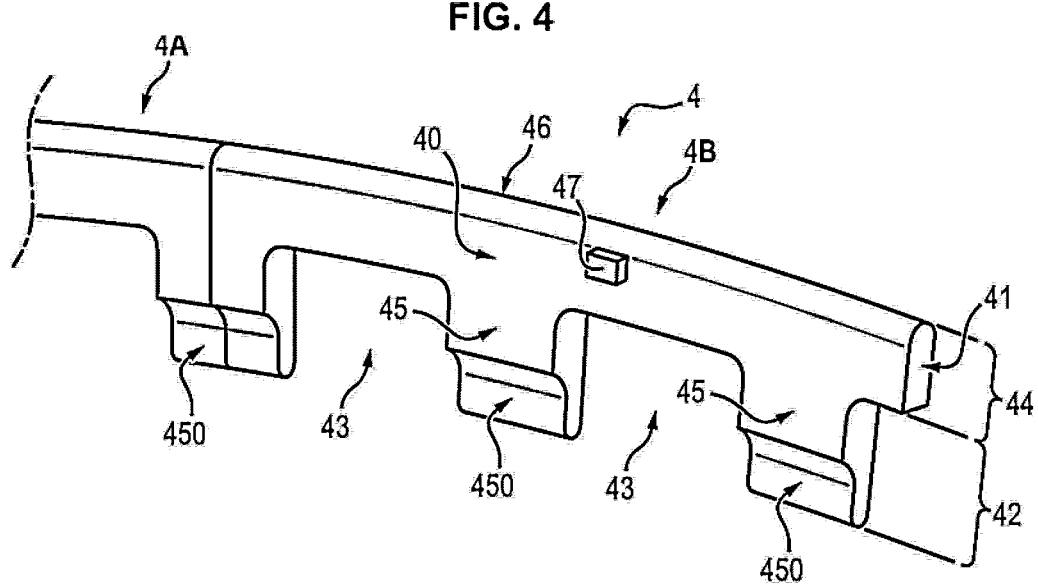
FIG. 4 is a perspective view of part of two ring segments forming the retaining ring conforming to the invention.

The radially inner portion 42 additionally comprises a plurality of radial extensions 45, each extension 45 extending between two adjacent recesses 43. In other words, each recess 43 is circumferentially delimited on either side by two radial extensions 45. Therefore, as can be seen in FIG. 4, each recess 43 extends radially, is substantially U-shaped and opens onto the inner circumferential edge of the ring 4. The extensions 45 allow the ring 4 to be properly clamped on the rotor disc 2 thereby improving the seal between the two.

Figure 5:
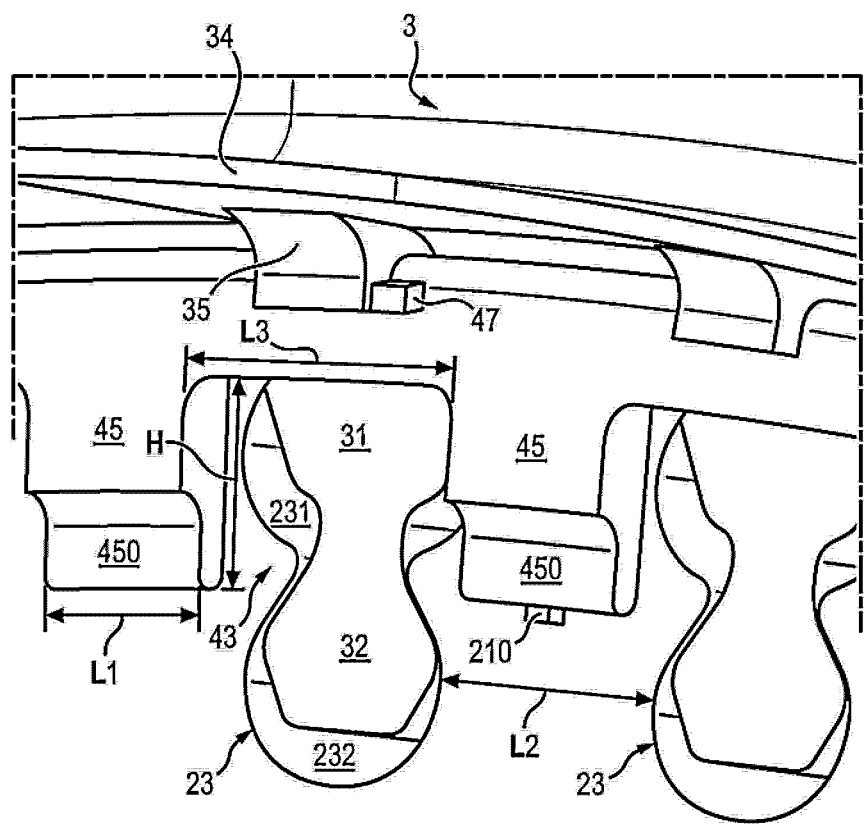
FIG. 5 is a perspective view of part of the retaining ring conforming to the invention, disposed in front of a rotor disc.

Advantageously, and as can be better seen in FIGS. 4 and 5, the extensions 45 can have a cut-out 450 at the upstream face thereof and in the vicinity of the radially inner end thereof. Said cut-out 450 makes it possible to thin the inner end of the extension, thereby reducing the overall weight of the ring 4.

Additionally, the ring 4 comprises a curved edge 46 on the outer circumference thereof.

The retaining ring 4 can be a ring in one piece extending over 360°, whether or not split. It can also be composed of several ring segments assembled circumferentially end-to-end to form said ring. The number of segments is not limiting but it is preferably between two and fifteen, and is advantageously a divisor of the number of blades. As solely illustrative example, two adjacent ring segments, referenced 4A and 4B, can be seen in FIG. 4.

The retaining ring 4 is positioned on the rotor disc 2 so that the planar downstream face thereof 41 is in contact with the upstream face 21 of this disc, and the radially outer portion thereof 44 lies facing the radially outer end of the slots 23, as is best seen in FIG. 3, and also so that the central axis thereof is coaxial with the central longitudinal axis X-X' of the disc 2.

Additionally, this retaining ring 4 is positioned so that each recess 43 is positioned facing a slot 23 as best seen in FIG. 5. Preferably, the ring 4 comprises as many recesses 43 as there are slots 23 on the rotor disc 2.

The extensions 45 do not take part in sealing but are provided to improve the bearing of the ring 4 on the disk 2. Without these extensions, the ring 4 might be subject to further movement. The dimensions of each extension 45 are therefore adapted accordingly.

With reference to FIG. 5, it can be seen that the tangential width (in circumferential direction) L1 of an extension 45 is smaller than the width L2 in circumferential direction between two adjacent slots 23 of the disc 2, so as not to block the passing of cooling air through these slots 23. Also preferably, this tangential width L1 is greater than or equal to 5 millimetres (mm).

Also, the height H of an extension 45 (also corresponding to the height H of a recess 43), in radial direction, is preferably greater than 2 mm. Also preferably, this height H is lower than the overall height H1, in radial direction, of the slot 23, since portion 44 of the ring 4 is positioned facing the upper end of the radially outer cavity 231 of the slot 23, as can be seen in FIG. 3. For example, the height of this slot 23 can reach 50 mm.

Finally, preferably, the dimensions of the recesses 43, and in particular the width L3 in circumferential direction of a recess 43 is greater than or equal to the width in circumferential direction of a slot 23 so that, when the retaining ring 4 is in position, the recesses 43 do not block the passing of air through the slot 23 and allow the air to properly cool the radially inner cavities 232 and radially outer 231 cavities.

Each blade 3 additionally comprises a groove 33 to receive a portion of the circumference of the retaining ring 4, or more specifically to receive a portion of the outer circumferential edge 46 of the ring 4.

Advantageously, and as can be seen in FIG. 3, the blade 3 comprises an upstream spoiler 34 extending axially upstream and provided on the radially inner surface thereof with a radially inner lug 35. It is this radially inner lug 35 that is provided with said groove 33 and this groove 33 leads into the direction of the axis X-X'.

As can be seen in FIG. 2, when the different blades 3 are placed in the slots 23 of the rotor disc 2, the respective upstream spoilers thereof 34 touch each other.

The groove 33 is advantageously conformed and sized so that the edge 46 is inserted therein without clearance. In other words, in axial section, the groove 33 has a semi-circular cross-section for example when the edge 46 is semi-circular, and this groove 33 is curved with the same radius of curvature as that of the ring 4.

Advantageously. anti-rotation fingers 47 are provided on the upstream face 40 of the ring, close to the edge 46. As can be seen in FIG. 5, the anti-rotation finger 47 comes into contact with the radially inner lug 35 and cooperates therewith to prevent rotation of the ring 4 in relation to the blades 3 and rotor disc 2.

Preferably, the ring 4 comprises several anti-rotation fingers 47, or else each ring segment 4A, 4B comprises two anti-rotation fingers, one for each direction of rotation.

As can be seen in FIG. 3, the annular flange 5 is configured to be positioned on the upstream side of the rotor disc 2 and to delimit a space E therewith.

Advantageously, the annular flange 5 therefore has an L-shaped cross-section with an axial branch 50 extended radially outwardly by a radial branch 51. Preferably, the radial branch 51 at the radially outer end 52 thereof comprises a protruding portion extending axially downstream.

Advantageously, but not compulsorily, an annular groove 53 is formed in this protruding portion. This groove 53 opens out downstream and is intended to receive an annular seal 6 preferably an O-ring.

Additionally, the flange 5 comprises at least one air-intake orifice 54 preferably arranged in the radial branch 51. Preferably, the flange 5 comprises several air-intake orifices 54 and more preferably as many orifices 54 as there are slots 23 on the rotor disc 2. Preferably each orifice 54 is aligned with a slot 23 when the flange is in position.

The annular flange 5 is secured to the rotor disc 2 so that the central axis thereof is coaxial with the central longitudinal axis X-X' of the disc 2, and so that the radially outer end 52 thereof is in contact with the retaining ring 4. In addition, if there is a seal 6 housed in the annular groove 53, the securing of the flange 5 onto the disc 2 is obtained so that the end 52 is in contact with the upstream face 40 of the solid radially outer portion 44.

Also, the flange 5 is secured to the rotor disc 2 by means of a fastening device 7. This fastening device 7 is a ring for example cooperating with the downstream end of the axial branch 50 of the flange 5 and with the rotor disc 2 to ensure this securing. Oher fastening devices 7 could also be envisaged e.g. a screw fastening.

It will be noted that when the ring 4 comprises several annular segments e.g. at least two, provision must be made for several raised edges (or low walls) 210 on the upstream face 21 of the rotor disc 2, preferably as many raised edges as segments. As can be seen in FIGS. 3 and 5, these raised edges 210 are disposed so that they lie radially inwardly in relation to the extensions 45 to lock the latter in position and prevent the ring 4 from moving out of the groove 33.

When the retaining ring 4 and annular flange 5 are positioned on the rotor disc 2 as illustrated in FIG. 3, the cooling air coming from upstream (on the left in FIG. 3) enters into space E through the air-intake orifices 54 as represented by arrow i.

This cooling air is then able to flow into the radially inner cavity 232 of each lot 23 as represented by arrow ii, and also into the radially outer cavity 231 as represented by arrow iii, by means of the presence of the recesses 43. For this purpose, it will be noted in FIG. 3 that the respective contours of the blade root 30 and slot 23 have been deliberately represented by dotted lines with 90° pivoting. This illustration is only schematic to allow viewing of the positioning of the heights of the different blade root lobes 31, 32 and different cavities 231 and 232. Evidently, the blade root and slot in fact extend axially as can be seen in FIGS. 2 and 5.

The annular flange 5 ensures a seal between upstream of the flange 5 and the space E. This sealing is also reinforced through the presence of the seal 6 disposed against the radially outer portion 44 of the retaining ring 4 not having recesses 43.

Additionally, the flange 5 allows calibration of cooling air via the dimensioning of the air-intake orifices 54 which are smaller than the recesses 43.

Also the retaining ring 4 and annular flange 5 cooperate to ensure axial locking of the blade roots 30 in the slots 23 of the disc 2. Any movement of the blade root 30 toward downstream (on the right in FIG. 3) or toward upstream (on the left in FIG. 3) is prevented by the fact that the groove 33 of the blade 3 is locked on the edge 46 of the ring 4 itself clamped against the upstream face 21 of the rotor disc 2 by the flange 5.

The device conforming to the invention therefore ensures cooling of the radially outer cavities 231 of the slots 23 of the rotor disc 2, whilst ensuring axial locking in position of the blades 3.

Although not limited thereto, the rotor conforming to the invention finds particular application in turbines of gas turbine engines and more particularly in low pressure turbines.

The invention claimed is:

1. A turbine rotor, comprising:
a rotor disc having a longitudinal axis of rotation and a plurality of radial blades, each radial blade having a blade root of bilobed shape, the rotor disc having an upstream side and an upstream face and being provided on a periphery of the rotor disc with a plurality of axial slots, each of the axial slots being configured to receive one of the blade roots, and each of the axial slots comprising a radially inner cavity extended by a radially outer cavity;
a retaining ring axially retaining the blade roots of the blades, the retaining ring comprising a radially inner portion provided with recesses and a solid radially outer portion, the solid radially outer portion having an upstream face,
an annular flange secured on the upstream side of the rotor disc so that a radially outer end of the annular flange is in contact with the retaining ring, the annular flange being configured to form a space with the rotor disc and the annular flange comprising at least one air-intake orifice opening into the space, and each radial blade comprising a groove receiving an outer circumferential edge of the retaining ring, wherein each of the recesses of the retaining ring is circumferentially delimited on either side by two radial extensions of the retaining ring, wherein a width, in circumferential direction, of one of the recesses is greater than or equal to a width, in circumferential direction, of one of the axial slots, and wherein the retaining ring is disposed against the upstream face of the rotor disc so that each of the recesses of the retaining ring lies facing one of the axial slots of the rotor disc, such that cooling air is able to enter via the at least one air-intake orifice into the space and to pass through the recesses of the retaining ring to reach the radially outer cavity of the axial slots of the rotor disc.

2. The turbine rotor according to claim 1, wherein the retaining ring comprises as many recesses as the number of axial slots on the rotor disc.

3. The turbine rotor according to claim 1, comprising an annular seal, disposed between the radially outer end of the annular flange and the upstream face of the solid radially outer portion of the retaining ring.

4. The turbine rotor according to claim 1, wherein the annular flange comprises as many cooling orifices as there are slots on the rotor disc.

5. The turbine rotor according to claim 1, wherein the annular flange has an axial branch and a radial branch, wherein the axial branch is secured to the rotor disc and and a radially outer end of the radial branch is in contact with the upstream face of the solid radially outer portion of the retaining ring, and wherein the at least one air-intake orifice is formed in the radial branch of the annular flange.

6. The turbine rotor according to claim 1, wherein the retaining ring comprises several ring segments, arranged end-to-end circumferentially about the longitudinal axis of rotation.

7. The turbine rotor according to claim 1, wherein a height, in a radial direction, of each of the two radial extensions disposed circumferentially on either side of a recess is lower than a height, in the radial direction, of the axial slot receiving the blade root, onto which the recess opens.

8. A turbine of a gas turbine engine, comprising at least one turbine rotor according to claim 1.

9. A gas turbine engine comprising at least one turbine of a gas turbine engine according to claim 8.

10. The turbine according to claim 8, wherein the turbine is a low pressure turbine.

\* \* \* \* \*